Patented Mar. 3, 1953

2,630,397

UNITED STATES PATENT OFFICE 2,630,397

METHOD OF BONDING SHEET MATERIALS AND COATING COMPOSITIONS THEREFOR

John C. Cowan, Peoria, Lee Bert Falkenburg, Decatur, and Arthur J. Lewis, Peoria, Ill., assignors to the United States of America as represented by the Secretary of Agriculture No Drawing. Original application May 5, 1944, Serial No. 534,382. Divided and this application December 27, 1948, Serial No. 67,552

13 Claims. (Cl. 154—138)

(Granted under Title 35, U. S. Code (1952), sec. 266)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention is a division of application Serial No. 534,382, filed May 5, 1944, now abandoned.

This invention relates to coating compositions obtained by combining polyamides of polymeric fat acids with waxes, plasticizers, other film-forming materials, and solvents. These compositions are useful for preparing grease-resistant and moisture-proof papers, cellophane, and other products, and to give a flexible coating on these products which is suitable for heat-sealing and laminating. This invention further relates to coating compositions obtained by combining these polyamides with plasticizers, waxes, resins, other film-forming materials, pigments, driers, and solvents. The compositions give excellent protective coatings for wood, iron, steel, aluminum and other surfaces.

Our compositions comprise as a major component the polyamides of polymeric fat acids which are described in the application for patent of Cowan, Falkenburg, Teeter and Skell, Serial No. 531,966, filed April 20, 1944, now Patent No. 2,450,940.

Polymerization of fatty oils takes place by intermolecular condensation at the double bonds of acyl radicals of polymerizable fat acids. The term "fat acid" as used in this specification and claims refers to the class of long-chain aliphatic acids which occur in fats and oils of vegetable and animal origin. The acids occur in fats and oils either in the free form or chemically bound as esters. However, it is to be understood that the term refers to the free unesterified acid. The reaction products thus obtained comprise dimeric and trimeric polymers formed, respectively, by the union of two or three molecules of fat acids, and also monomeric unpolymerized compounds. In addition, some products which may be classified as cracked materials are obtained. Thus, polymeric fat acid esters can be obtained from substances comprising polymerizable fat acid esters by subjecting them to a polymerization process followed by elimination of the monomeric fraction of the treated material.

Polymeric fat acids can be produced, for instance, from fatty acids containing glycerides of polymerizable fat acids, such as peanut, cottonseed, wheat, soybean, corn, and linseed, tung, dehydrated castor, perilla, conjugated linseed, and other oils of the drying or semidrying type.

The oil may be polymerized in the usual manner by thermal treatment. Suitable polymerization catalysts may be used. Where catalysts are used, the temperatures required for polymerization vary with the type of catalyst. The polymeric glycerides may then be saponified and acidified and the non-polymeric fraction removed by distillation of the free acid.

Another procedure suitable for the production of polymeric fat acids comprises subjecting a fatty oil of the aforementioned type to alcoholysis with monohydric alcohols, such as methanol and ethanol, thereby converting the glycerides of the fat acids to the corresponding monohydric alcohol esters. Then, these esters are polymerized, yielding monohydric alcohol esters of polymeric fat acids which can be segregated from the other reaction products by distillation and which can be converted to polymeric fat acids by hydrolysis.

Still another method of obtaining polymeric fat acids comprises producing the free fat acids by hydrolysis of the fatty material, polymerizing the free acids in some suitable way, and isolating the polymeric fat acids. This method is applicable to oils whose acids will polymerize without much decarboxylation of the fat acids.

The polymeric fat acid obtained by any of the foregoing procedures consists primarily of dibasic dimeric fat acids, having an average molecular weight of about 560, admixed with trimeric tribasic fat acid, the average molecular weight of which is approximately 840.

According to the invention disclosed in the copending application referred to above, high molecular weight polymeric products can be obtained by reacting polyamines with polymeric fat acids or with amide-forming derivatives of fat acids. The amide-forming derivatives of polymeric fat acids are their esters, anhydrides, and acyl halides.

The resulting products are polyamides of polymeric fat acids. They have a molecular weight of about 3,000 to 9,000. These products are obtained, for example, by heating, preferably equimolecular amounts (although an excess of either reactant may also be used), of a polyamine with polymeric fat acids, or with an amide-forming derivative of polymeric fat acids. Polymeric fat acids obtained by polymerization of fatty oils, or of various fractions or derivatives thereof, such as the dimeric or mixed dimeric and trimeric fat acids and their amide-forming derivatives, may also be used.

Satisfactory results are obtained by reacting polyamines with esters of polymeric fat acids, such as their methyl or ethyl esters.

The polyamides are obtained by reacting the polymeric fat acids with polyamines in approximately equivalent amounts. These amounts may be calculated from titration of the starting materials for their acidity and basicity. The reaction is effected by heating the materials at such a temperature that polyaminolysis of the fat esters or the dehydration of the polyamine salts of the fat acids will occur readily. Temperatures of 150° to 175° C. for a few hours with 175° to 225° C. for 20 to 40 minutes just prior to removal of polyamide from the reaction chamber are sufficient. The time and temperature will vary depending on materials used and type of product desired. Lower temperatures of 100° to 125° C. are used if all the polyamine is added at the start of the reaction since higher temperatures can cause foaming. In addition, polyamides can be obtained with mixtures of polymeric fat acids with other dibasic acids, such as sebacic, adipic, terphthalic, and fumaric acids.

The polyamides obtained from polymeric fat acids or esters and alkylene diamines possess unusual solubility characteristics. These polyamides are soluble in alcohols, such as isopropyl or butyl and in mixtures of alcohols with both aromatic or petroleum hydrocarbons. The solubility of these polyamides in the above-mentioned solvents is of value because it facilitates the formulation of numerous compositions containing these polyamides which are useful for the coating of various materials which require application from solution.

One such polyamide resin made from ethylene diamine and the polymeric fat acids from soybean oil, developed by the United States Department of Agriculture, is known as Norelac. It is described in the copending application referred to above.

In general, the polyamides obtained with the alkylene diamines, ethylene through hexamethylene diamine, are the more desirable polymers to use, but the characteristics of the polymer are more important than its source. Combinations of the polyamides from these alkylene diamines with other products can be made which melt readily at 230° to 270° F., or higher, so that a heat-seal can be easily obtained on short exposure of coated sheets to a sealing iron. The ethylene and hexamethylene diamine polyamides of polymeric fat acids can be prepared to give melting ranges of 108° to 112° C. and 75° to 85° C., respectively. The ethylene diamine polyamide gives hard films, and it is an excellent base for surface coatings for wood, metal, and other structural materials. The hexamethylene diamine polyamide gives softer and more flexible films than the ethylene diamine, and the hexamethylene polyamide has a greater tendency to block; i. e., when the sheets or fabricated articles are piled face to face, the coatings fuse together. By suitable choice of plasticizers and waxes, however, these polyamides give coating compositions which are flexible at −15° to −20° F., and which do not block at 160° F. under two pounds per square inch pressure.

The ethylene and hexamethylene diamine polyamides are compatible with manila, kauri, a phenol-modified coumarone-indene (M. P. 85°–95° C.), rosin, ester gum, cellulose nitrate, and various types of phenol-formaldehyde resins, such as the soluble-fusible type which convert to insoluble polymers, and the para-substituted phenol-formaldehyde resins.

The incorporation of waxes into coating compositions containing the ethylene diamine polyamide improves the moisture-vapor transmission characteristics. This phenomenon is not unusual since waxes are generally used to improve the moisture-vapor transmission of resins, such as cellulose nitrate and damar gum. However, there is an optimum percentage of wax that may be added to these polyamides to obtain the maximum resistance to moisture-vapor transfer. This percentage varies from 0.2 to 5 percent depending on the polymeric fat acid polyamide and wax used, and on the amount of a third or fourth constituent which may be added. For example, in most cases with the ethylene diamine polyamide, 2 to 3 percent of paraffin wax (M. P. 65°–69° C.) is optimum, while the optimum percentage for certain micro-crystalline petroleum waxes, such as Barnsdall 160 wax is 0.3 to 0.8 percent.

If a series of films of the ethylene diamine polyamide containing different percentages of paraffin is prepared on glass slides and examined under a microscope, the reason for these limiting values becomes evident. The film of the pure polyamide and the ones containing 1 and 2 percent paraffin wax when examined under the microscope are clear, smooth, homogeneous films. In the film containing 3 percent paraffin wax, however, crystals of the paraffin appear, and if the percentage of paraffin is increased, this crystal formation also increases; the amount of crystals formed per unit area being proportional to the additional amount of wax added. Excessive crystal formation is deleterious to the moisture-proofing qualities of the polyamide film, because the crystals of wax cause small "breaks" or "pinholes" to occur in the film thus destroying its continuity or homogeneity.

The addition of a plasticizer or resin, such as a phenol-modified coumarone-indene (M. P. 5°–15° C.), allows a larger percentage of paraffin or other wax to be added before undue crystallization of the wax occurs. For example, in the presence of 10 percent of a phenol-modified coumarone-indene resin, over 3 percent of paraffin wax may be added to the polyamide before the moisture-proofing qualities are markedly impaired.

The polyamide alone, when deposited 6 pounds/ream on 30-pound kraft paper, gave a moisture-vapor transmission of 10.2 g./100 sq. in./24 hours at 100° F. at a relative humidity of 95 percent. The same polyamide containing 2 percent of paraffin wax, when coated on the kraft paper at the same weight per ream, gave a transmission of 0.2 g./100 sq. in./24 hours, while the transmission of the polyamide containing 3 percent paraffin on kraft paper at 6.5 pounds/ream was 0.8 g./100 sq. in./24 hours.

Other waxes, such as ceresin, may also be used in limited amounts with the polyamides to obtain moisture-proof compositions.

The low temperature flexibility of these polyamide coating compositions can be improved by the incorporation of plasticizers, such as hydrogenated or unhydrogenated abietic acid esters, ester gum, relatively non-volatile alcohols, such as di-t-amyl cyclohexanol and hydroabietyl alcohol, polymeric fat acids, N, N-diethyllauramide, tributyl phosphate, N, N-di-n-butylurea, long chain fat acid nitriles, and so forth.

The following examples show how compositions of these polyamides with waxes, resins, and plasticizers may be used to obtain coating compositions possessing excellent resistance to moisture-vapor transfers. All of the transmission rates were obtained at 100° F. and a relative humidity of 95 percent or higher.

*Example I*

The ethylene diamine polyamide (M. P. 108°–112° C.), as described in Example 3 of the above-mentioned copending application (Serial No. 531,966, U. S. Patent 2,450,940), was dissolved in a solvent mixture of equal parts of benzene, isopropyl alcohol, n-butyl alcohol, and petroleum hydrocarbon (B. P. 190°–208° F.). To various samples of this solution were added 1, 2, and 3 percent of paraffin wax. These solutions when coated on plain transparent regenerated cellulose gave the following moisture-vapor transmissions.

| Paraffin (Percent) | Transmission g./100 sq. in./24 hrs. uncreased | Weight per ream |
| --- | --- | --- |
| 0 | 7.5 | 10 |
| 1 | 0.6 | 8 |
| 2 | 0.3 | 8 |
| 3 | 0.8 | 8 |

Example 3 of said patent describes the preparation of a resin by heating polymeric fat acids derived from soybean oil (dimer-trimer ratio of 1.8) with ethylene diamine.

*Example II*

The hexamethylene diamide polyamide (note Example 13 of U. S. Patent 2,450,940) was dissolved in the same solvent combination mentioned in Example I, and 2 percent paraffin wax was added to one sample of the solution. The solutions were cast on 30-pound glassine paper.

| Paraffin (Percent) | Transmission g./100 sq. in./24 hrs. uncreased | Weight per ream |
| --- | --- | --- |
| 0 | 5.9 | 9.5 |
| 2 | 0.7 | 10.5 |

To the solution containing 2 percent paraffin there was added 10 percent of a phenolic-modified coumarone-indene resin (M. P. 5°–15° C.). The resulting composition was coated onto glassine and at 11 pounds per ream gave a transmission of 0.68 g./100 sq. in./24 hours.

*Example III*

The ethylene diamine polyamide was dissolved in the solvent mixture given above and 2 percent ceresin wax was added. This composition was coated 7 pounds per ream on 30-pound kraft paper. The coated paper gave a moisture transmission of 0.6 g./100 sq. in./24 hours.

*Example IV*

The ethylene diamine polyamide was dissolved in the solvent mixture mentioned in Example I, and enough di-tertiaryamyl cyclohexanol and paraffin wax were added to give a 10 and 2 percent concentration, respectively. This solution was used to coat 30-pound kraft and 30-pound opaque and transparent glassine to give approximately 7 pounds per ream. The transmission of water vapor at 100° F. and a relative humidity of 95 percent were respectively 0.6, 0.4, and 0.35 g./100 sq. in./24 hours.

Other solvent mixtures, besides the one given in the above examples, may be employed and their composition would depend on the plasticizers, resins, and waxes used, and on the rate of solvent evaporation which was desired.

Without plasticizers the ethylene diamine polyamide-paraffin combinations are flexible to 2° to 5° C. However, if 10 to 15 percent of plasticizer is included, such as a phenol-modified coumarone-indene resin (M. P. 5°–15° C.), hydrogenated abietic acid esters, and other materials mentioned elsewhere in this application, the films are flexible at temperatures as low as −25° to −30° C.

These polyamide coatings are resistant to penetration by vegetable oil and high molecular weight hydrocarbon oils or greases.

*Example V*

To illustrate the greaseproofing properties of these polyamides, sheets of 30-pound kraft and 25-pound sulfite paper were coated with the ethylene diamine polymer (6 pounds/ream). The coated sheets were then exposed to the action of corn oil and vaseline.

| Base Stock | Test Reagent | Results |
| --- | --- | --- |
| 30-lb. Kraft | Corn oil | Coating unaffected after 6 weeks and no penetration of the reagent could be detected for any of the four test sheets. |
| Do | Vaseline | |
| 25-lb. Sulfite | Corn oil | |
| Do | Vaseline | |

*Example VI*

The addition of wax and plasticizer does not destroy the greaseproofing properties of the polyamides. Thirty-pound kraft and 25-pound sulfite were coated (6 pounds/ream) with a composition consisting of the ethylene diamine polyamide plus 2 percent paraffin wax and 10 percent a phenol-modified coumarone-indene (M. P. 10° C.) and the films were exposed to corn oil and vaseline.

| Base Stock | Test Reagent | Results |
| --- | --- | --- |
| 30-lb. Kraft | Corn oil | Coating unaffected after 6 weeks and no penetration of the reagent could be detected for any of the test sheets. |
| Do | Vaseline | |
| 25-lb. Sulfite | Corn oil | |
| Do | Vaseline | |

Films of the polyamides obtained from polymeric fat acids and alkylene diamines or combinations of these polyamides with various materials, such as resins, waxes, and plasticizers, possess excellent cohesion and adhesion so that they make valuable heat-sealing or laminating agents. By the application of heat and pressure, these polyamides or polyamide compositions fuse so that excellent bonds are obtained between two or more sheets of the coated paper. The temperature necessary to effect a good seal varies from 90° to 130° C. depending on the sealing equipment employed.

*Example VII*

Sheets of 30-pound kraft, 30-pound glassine, and 25-pound sulfite paper were coated with a solution of the ethylene diamine polyamide and the solvent removed. The samples were then folded so that the coated sides were together and heat and slight pressure applied for a few seconds. Shear tests on these seals showed that the heat bonding effected seals which were stronger than the paper; in every test the paper failed rather than the heat seal.

*Example VIII*

Films of the hexamethylene polyamide were cast on 30-pound kraft, 30-pound glassine, and 25-pound sulfite papers (6 pounds/ream). Heat and pressure were applied as in Example VII. Bonds stronger than the paper were obtained in all tests.

Example IX

A sheet of regenerated cellulose was coated on one side with a solution of the ethylene diamine polyamide and the solvent removed. Heat and pressure were applied as in Example VII. A very strong seal resulted.

The addition of a wax, resin, and plasticizer has no adverse effect on the strength of the bond obtained from the heat-sealing operation and in some cases the addition of a resin or plasticizer will increase the strength of the bond. Further, two or more sheets of dissimilar materials may be firmly bonded with the polyamides of polymeric fat acids or esters and an alkylene diamine by means of heat and pressure.

Protective coatings are generally of two types, those which "dry," viz., become tack-free solely by evaporation of solvent and those which dry by oxidation. Both types have advantages and disadvantages. The coatings which dry by means of solvent evaporation are of advantage because of the speed at which they obtain a tack-free condition, but they remain permanently soluble and fusible. On the other hand coatings which dry by means of oxidation generally require much longer times to become tack free, but during this process of oxidation they lose their solubility characteristics and become insoluble and infusible, properties which are valuable in many cases.

Protective coatings of the polyamides prepared from polymeric fat acids or esters and alkylene diamines or combinations of these polyamides with various other resinous materials and/or pigments or driers, dry by solvent evaporation, attaining tack-free state exceedingly rapidly. In addition, these coatings are converted slowly by means of oxidation to insoluble and infusible films. Further, these coatings possess excellent resistance to attack by water, alkali, acids, and brine and adhere exceptionally well to various surfaces, such as wood, iron, glass, steel, tin, chromium, et cetera.

Examples of coating compositions using the above-mentioned polyamides or combinations of these polyamides with other film-forming adjuncts for the protection of various surfaces are as follows:

Example X

Thirty grams of the ethylene diamine polymer was dissolved in 70 grams of a solvent mixture consisting of equal parts of volume of n-butyl alcohol, isopropyl alcohol, and V. M. P. naphtha. Films cast with this composition on glass dried free-from-tack in a few minutes. These films when placed in distilled water exhibited no blush after 24 hours. They were also unaffected after 24 hours exposure to 30 percent solution of sodium hydroxide, 4 percent acetic acid, and 20 percent sulfuric acid. After 4 months of exposure to air, the films were converted to an insoluble and infusible form by oxidation.

Example XI

A clear spirit varnish or lacquer composition may be prepared by dissolving 30 grams of the ethylene diamine polymer in 70 grams of the solvent mixture given in Example X and adding 3 to 10 grams of ester gum. These compositions also give films which dry rapidly and which are resistant to attack by water, acids, and alkalis. The addition of the ester gum lowers the viscosity of the composition at equal solids content so that better leveling and brushing characteristics are obtained over those present in Example X. Other resins, such as kauri, modified coumarone-indene, and various types of phenolics may be substituted for the ester gum.

The polyamides may also be milled with pigments in the dry state on rolls, such as rubber rolls, to give pigmented compositions. Such compositions can then be dissolved in solvents and the pigments will remain suspended in the solution. Solutions of the polyamides may also be directly pigmented on ball or pebble mills, or in colloid mills.

Examples of protective coating compositions using pigments are as follows:

Example XII

To illustrate the method of "dry" pigmentation, 50 g. of the ethylene diamine-polymeric soybean fat acid polyamide was placed on a small laboratory rubber mill, heated with steam coils to approximately 90° C., and milled until soft. Ten grams of titanium dioxide was then added in small portions over a period of 15 minutes and the mixture was milled for an additional period of 20 minutes until a homogeneous mass was obtained. This polyamide-pigment mixture was then allowed to cool to 60° C. and sheeted from the mill. At room temperature, the sheet was broken into small chips which readily dissolved in appropriate solvents to give directly a pigmented vehicle suitable for a white enamel. The pigment showed no appreciable tendency to settle out, and a resultant film possessed excellent gloss.

Example XIII

To illustrate that solutions of the polyamides may be pigmented, 100 g. of a 30 percent solution of the polyamide used in Example V, dissolved in a mixture of equal volumes of isopropyl alcohol and V. M. P. naphtha, together with 43 g. of titanium dioxide was placed in a porcelain grinding jar along with approximately an equal volume of grinding pebbles. The jar was then placed on a mill assembly and milled for 24 hours. At the end of this time, the pigment was thoroughly wet and ground into the vehicle and showed no appreciable tendency to settle out.

Example XIV

To demonstrate that the above pigment-vehicle ratio is not critical, the procedure in Example XIII was repeated with 20 g. of pigment to 100 g. of polyamide solution. The resulting pigmented vehicle was superior in durability on outside exposure to that obtained in Example XIII, and possessed more gloss, but was not quite as white in color.

Example XV

One hundred grams of a 35 percent solution of the polyamide prepared from ethylene diamine and polymeric linseed methyl esters, dissolved in a mixture of isopropyl alcohol and V. M. P. naphtha, together with 43 g. of 35 percent leaded zinc oxide, was ground in a pebble mill for 24 hours. The resulting white enamel showed no tendency to "liver" or thicken over a period of two months, illustrating that "reactive" pigments may be used with properly prepared polyamides.

The use of other pigments is illustrated by the following examples:

Example XVI

One hundred grams of a 35 percent solution of the polyamide and 10 g. of iron blue were ground in a pebble mill for 24 hours. This composition gave a pigmented vehicle with a deep rich blue color, and possessing excellent gloss.

Example XVII

A composition of 100 g. of a 35 percent solution of the polyamide and 5 g. of carbon black was prepared as in Example XVI. The resulting enamel gave films having a glossy black color.

Other pigments, both reactive and non-reactive, may also be used. Since polyamides properly prepared from polymeric fat acids (or esters) and ethylene diamine or hexamethylene diamine are practically neutral, no appreciable reaction between the pigment and vehicle will occur.

One of the outstanding features of these polyamides is their compatability with cellulose nitrate. Protective coatings may be prepared using mixtures of these polyamides with cellulose nitrate which are superior to either of these film-forming materials when used alone. For example, the films of the polyamide tend to be readily marred and possess poor resistance to boiling water. By the incorporation of various percentages of cellulose nitrate in the polyamides, coatings may be obtained which do not mar readily and which possess good resistance to boiling water. Cellulose nitrate coatings adhere poorly to many surfaces, but by the simple expedient of adding these polyamides, excellent adhesion is obtained. Furthermore, cellulose nitrate coatings are extremely brittle and require the addition of large amounts of plasticizers. We have found that this brittleness in cellulose nitrate is partially overcome by the addition of the proper proportions of the polyamides without the use of additional plasticizers. This is illustrated in the following examples:

Example XVIII

Equal weights of ¼ sec. R. S. nitrocellulose and the ethylene diamine-polymeric fat acid polyamide were dissolved in a mixture of equal volumes of butanol, V. M. P. naphtha, and butyl acetate. The resulting vehicle gave clear films which were very mar-proof, possessed good adhesion to most surfaces, were flexible, and showed good resistance to boiling water.

Example XIX

A clear lacquer which dries rapidly and which possesses excellent adhesion may be prepared by dissolving 180 grams of the ethylene diamine polymer along with 28 grams of R. S. ½ sec. nitrocellulose (wet weight) in 800 grams of a solvent mixture consisting of 30 percent isopropyl alcohol, 30 percent n-butyl alcohol, 30 percent ethyl acetate, 5 percent V. M. P. naphtha, and 5 percent butyl acetate (by volume). This lacquer is useful for brushing or dipping operations and may be sprayed if diluted to the proper viscosity with additional solvent.

Example XX

A clear lacquer possessing all the properties of the one given in Example XVIII, but which will remain flexible at lower temperatures may be prepared by adding 5 to 15 percent by weight of the solids, a plasticizer, such as tributyl phosphate or butyl phthalate. Other plasticizers may also be employed. Other types of nitrocellulose, such as the higher or lower viscosity types, alcohol soluble types, etc., may be used in conjunction with these polyamides of polymeric fat acids or esters and alkylene diamines.

Compositions consisting of the polyamides and nitrocellulose may be pigmented using methods similar to those given in Examples XIII to XVII. The following example is given by way of illustration.

Example XXI

To 80 grams of the clear lacquer composition given in Example XIX is added 20 grams of an olive drab pigment and the mixture ground in a colloid mill for a ½ hour to 1 hour. Films of this pigment lacquer possess excellent adhesion to metal surfaces, such as tin plate or steel, are flexible, and offer excellent protection from corrosion by salt water. Other types of pigments may be used in place of the olive drab, such as carbon black, iron oxides, titanium dioxide, et cetera and various pigment to vehicle ratios can be employed.

We claim:

1. A coating composition for sheet material possessing high resistance to moisture-vapor transfer comprising an alkylene diamine polyamide of polymerized polyene fatty acids, the polyamide having a molecular weight between about 3,000 and 9,000, said alkylene diamine containing at least two but not more than six carbon atoms, 0.2 to 5 percent paraffin wax, a plasticizer, and a volatile solvent.

2. A coating composition for sheet material possessing high resistance to moisture-vapor transfer comprising an alkylene diamine polyamide of polymerized polyene fatty acids, the polyamide having a molecular weight between about 3,000 and 9,000, said alkylene diamine containing at least two but not more than six carbon atoms, 0.2 to 5 percent ceresin wax, a plasticizer and a volatile solvent, 3. In a method of forming a bond between sheets of material by applying a fusible coating between the sheets and applying heat and pressing the sheets together to fuse the coating and bond the sheets together, the improvement comprising employing as the fusible coating an ethylene diamine polyamide resin having a molecular weight between 3,000 to 9,000 prepared by heating ethylene diamine with polymeric polyene soybean oil fatty acid, the bonding being at 90° to 130° C., the polymeric polyene soybean oil fatty acid essentially comprising a mixture of the dimer and trimer.

4. In a method of forming a bond between sheets of material by applying a fusible coating between the sheets and applying heat and pressing the sheets together to fuse the coating and bond the sheets together, the improvement comprising employing as the fusible coating an ethylene diamine polyamide resin having a molecular weight between 3,000 to 9,000 prepared by heating ethylene diamine with a polymeric amide-forming substance taken from the group consisting of polymerized polyene fatty acids, and the esters and anhydrides thereof.

5. Laminated cellulosic sheet material bonded together with a heat-sealed film of an ethylene diamine polymeric soybean oil fatty acid polyamide resin having a molecular weight between about 3,000 and 9,000 and being the heat reaction product of ethylene diamine and polymeric soybean oil polyene fatty acids having a dimer-trimer ratio of about 1.8.

6. Laminated sheet material bonded together with a heat-sealed film of a polyamine polymeric soybean oil polyene fatty acid polyamide resin.

7. Laminated cellulosic sheet material bonded together with a heat-sealed film of a polyamine polymeric soybean oil polyene fatty acid resin, the polyamine being taken from the group consisting of ethylene diamine and hexamethylene diamine, the polymeric soybean oil fatty polyene acid essentially comprising a mixture of the dimer and trimer.

8. In a method of forming a bond between sheet material, the improvement comprising coating sheet material with an alkylene diamine polyamide of a mixture of trimeric and dimeric polymerized polyene fat acids, the polyamide having a molecular weight between 2,000 and 9,000, said alkylene diamine containing at least two, but not more than six, carbon atoms, and heat-sealing contiguous coated surfaces at a temperature of from 90° to 130° C.

9. The method of forming a bond between cellulosic sheet material comprising coating the cellulosic material with a resin which is an ethylene diamine polyamide of a mixture of trimeric and dimeric polymerized soybean oil polyene fatty acid, the resin having a molecular weight between about 3,000 to 9,000, and heat-sealing contiguous coated surfaces of the material at a temperature between about 90° to 130° C.

10. The method of forming a bond between glassine comprising coating glassine material with a resin which is an ethylene diamine polyamide of a mixture of trimeric and dimeric polymerized soybean oil polyene fatty acid, the resin having a molecular weight between about 3,000 to 9,000, and heat-sealing contiguous coated surfaces of the material at a temperature between about 90° to 130° C.

11. A heat-sealing coating composition for sheet material possessing high resistance to moisture-vapor transfer comprising an alkylene diamine polyamide of a mixture of dimeric and trimeric polymerized polyene fat acids, the polyamide having a molecular weight between about 3,000 to 9,000, said alkylene diamine containing at least two, but not more than six, carbon atoms, 0.2 to 5 percent wax, and a volatile solvent.

12. A heat-sealing coating composition for sheet material possessing high resistance to moisture-vapor transfer, comprising a resin which is an ethylene diamine polyamide of a mixture of dimeric and trimeric polymerized soybean oil polyene fatty acid, the resin having a molecular weight between about 3,000 to 9,000, 0.2 to 5 percent wax, and a plasticizer.

13. A coating composition possessing high resistance to moisture-vapor transfer comprising a resin which is an alkylene diamine polyamide of a mixture of trimeric and dimeric polymerized soybean oil polyene fatty acid, the resin having a molecular weight between about 3,000 to 9,000, the alkylene diamine containing at least two, but not more than six, carbon atoms, two to five percent wax, a plasticizer, and a volatile solvent.

JOHN C. COWAN.
LEE BERT FALKENBURG.
ARTHUR J. LEWIS.

REFERENCES CITED

The following references are of record in the file of this patent:

UNITED STATES PATENTS

| Number | Name | Date |
| --- | --- | --- |
| 1,313,343 | Sidwell | Aug. 19, 1919 |
| 2,102,207 | Hunt et al. | Dec. 14, 1937 |
| 2,206,090 | Haggenmacher | July 2, 1940 |
| 2,350,292 | Spermattei et al. | May 30, 1944 |
| 2,367,712 | Bradley | Jan. 23, 1945 |
| 2,371,314 | Rhodes | Mar. 13, 1945 |
| 2,379,413 | Bradley | July 3, 1945 |
| 2,393,987 | Harmon | Feb. 5, 1946 |
| 2,404,896 | Aelony | July 30, 1946 |

OTHER REFERENCES

Southwick, "Modern Packaging," vol. 21, October 1947, pages 143–148 and 196.

Cowan et al., Oil and Soap, 21, pages 101–107, 106–186, April 1944.